(12) United States Patent
Jowett

(10) Patent No.: US 8,114,277 B2
(45) Date of Patent: Feb. 14, 2012

(54) WATER TREATMENT SYSTEM INCLUDING FOAM BLOCK

(76) Inventor: E. Craig Jowett, Rockwood (CA)

( * ) Notice: Subject to any disclaimer, the term of this patent is extended or adjusted under 35 U.S.C. 154(b) by 0 days.

(21) Appl. No.: 11/963,892

(22) Filed: Dec. 24, 2007

(65) Prior Publication Data
US 2008/0153154 A1  Jun. 26, 2008

(30) Foreign Application Priority Data
Dec. 22, 2006  (GB) ................... 0625791.9

(51) Int. Cl.
*C02F 3/06* (2006.01)

(52) U.S. Cl. .............. 210/150; 210/170.08; 210/615

(58) Field of Classification Search ............. 210/150, 210/151, 170.08, 510.1, 615, 617
See application file for complete search history.

(56) References Cited

U.S. PATENT DOCUMENTS

| | | | |
|---|---|---|---|
| 3,293,174 A | 12/1966 | Robjohns | |
| 4,427,548 A | 1/1984 | Quick, Jr. | |
| 4,524,139 A * | 6/1985 | Fuchs | 210/618 |
| 4,678,582 A * | 7/1987 | Lavigne | 210/150 |
| 5,164,089 A * | 11/1992 | Preston | 210/150 |
| 5,543,052 A * | 8/1996 | Lupton et al. | 210/150 |
| 5,637,218 A * | 6/1997 | Kickuth | 210/170.08 |
| 5,707,513 A | 1/1998 | Jowett et al. | |
| 5,762,784 A | 6/1998 | Jowett | |
| 5,980,739 A | 11/1999 | Jowett | |
| 5,997,747 A | 12/1999 | Jowett | |
| 6,063,268 A | 5/2000 | Jowett | |
| 6,153,094 A | 11/2000 | Jowett et al. | |
| 6,270,661 B1 | 8/2001 | Jowett | |
| 6,749,745 B2 * | 6/2004 | Jowett | 210/150 |
| 6,808,631 B2 * | 10/2004 | Paloheimo | 210/150 |
| 6,977,038 B2 | 12/2005 | Jowett | |
| 7,288,192 B2 | 10/2007 | Jowett | |

FOREIGN PATENT DOCUMENTS

| CA | 2096175 | 11/1993 |
|---|---|---|
| EP | 0104525 | 4/1984 |
| WO | WO 80/02556 | 11/1980 |

* cited by examiner

*Primary Examiner* — Christopher Upton
(74) *Attorney, Agent, or Firm* — Anthony Asquith Corp.

(57) ABSTRACT

The water to be treated might be river water which needs to be clarified, or might be septic tank effluent which needs to have its BOD and dissolved organics content diminished, and its ammonium oxidized. Treatment is done by passing the water through a block of soft open-cell foam. The block of foam is rectanguloid in its basic form. The block of foam is housed in a watertight box. The rectanguloid form enables minimal hydraulic heads, and is simple and cheap to manufacture and install.

20 Claims, 5 Drawing Sheets

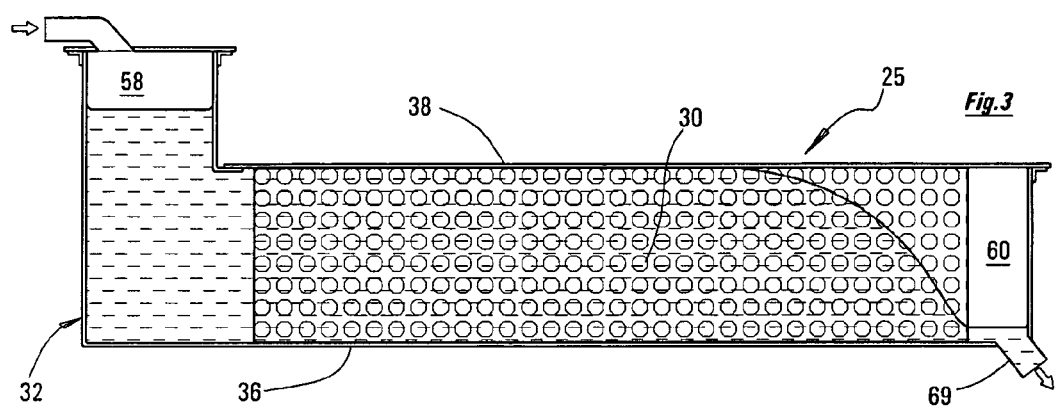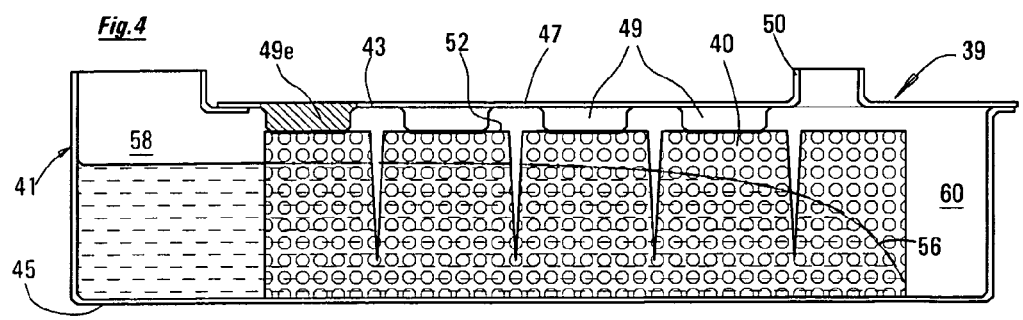

WATER TREATMENT SYSTEM INCLUDING FOAM BLOCK

This invention relates to water treatment. It is associated with technology disclosed in, for example, patent publication U.S. Pat. No. 7,022,222 (Jowett, April 2006).

An aim of the present invention is to provide adequate and effective treatment while using less resources. One aim is to so dispose the treatment material (preferably, polyurethane foam) that the foam can be in the form of a single unitary rectangular parallelepiped, herein termed a rectanguloid. A rectanguloid usually is the cheapest form in which foam can be obtained. Another aim is to enable the use of smaller pressure heads, and thus expand the range of terrains in which naturally-occurring heads can be sufficient to power the treatment.

The invention is described with reference to the accompanying drawings, in which:

FIG. 3 is a longitudinal cross-section of a portion of the treatment station of FIG. 2.

FIG. 4 is a similar cross-section of an aerobic treatment station.

The scope of the patent protection sought herein is defined by the accompanying claims. The apparatuses and procedures shown in the accompanying drawings and described herein are examples.

The physical features described herein, although shown in or described in respect of just one exemplary structure, should be understood as being applicable also to other structures, or as being interchangeable with corresponding features of other structures, unless otherwise stated, or unless such would be understood to be physically impossible.

Figure 1:
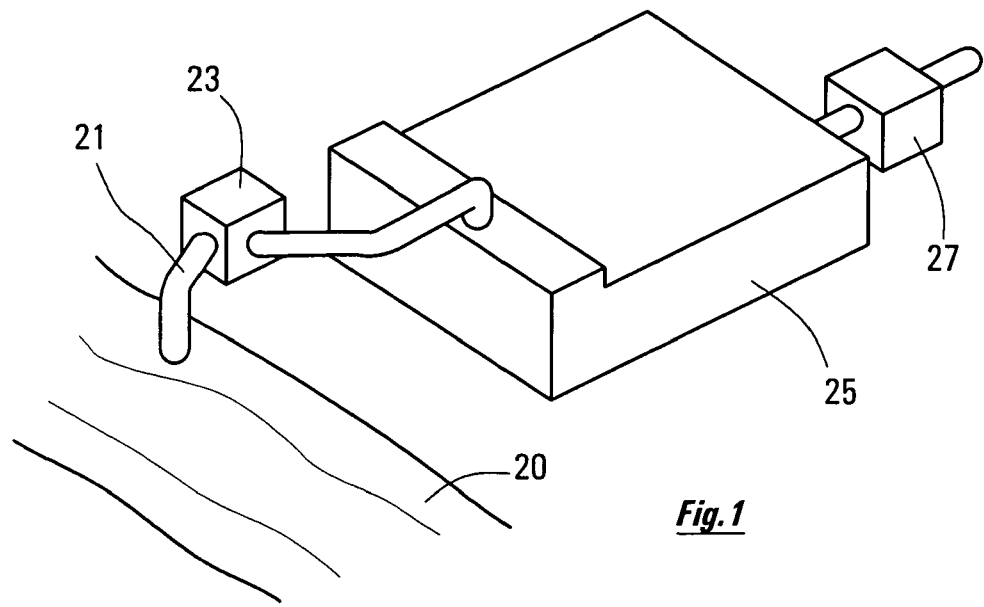
FIG. 1 is a pictorial view of a river; water drawn from the river is being passed through a treatment station and a disinfectant station.

The new treatment system will first be described as it relates to treating river water, and to rendering the same suitable for human use, including for drinking (after further disinfection). FIG. 1 shows a river 20, and a pipe 21 from which water is being drawn by means of a pump 23. The water passes through an anaerobic treatment station 25. The emerging water passes through a disinfectant station 27. The disinfected treated water, being now potable, passes to suitable storage.

Figure 2:
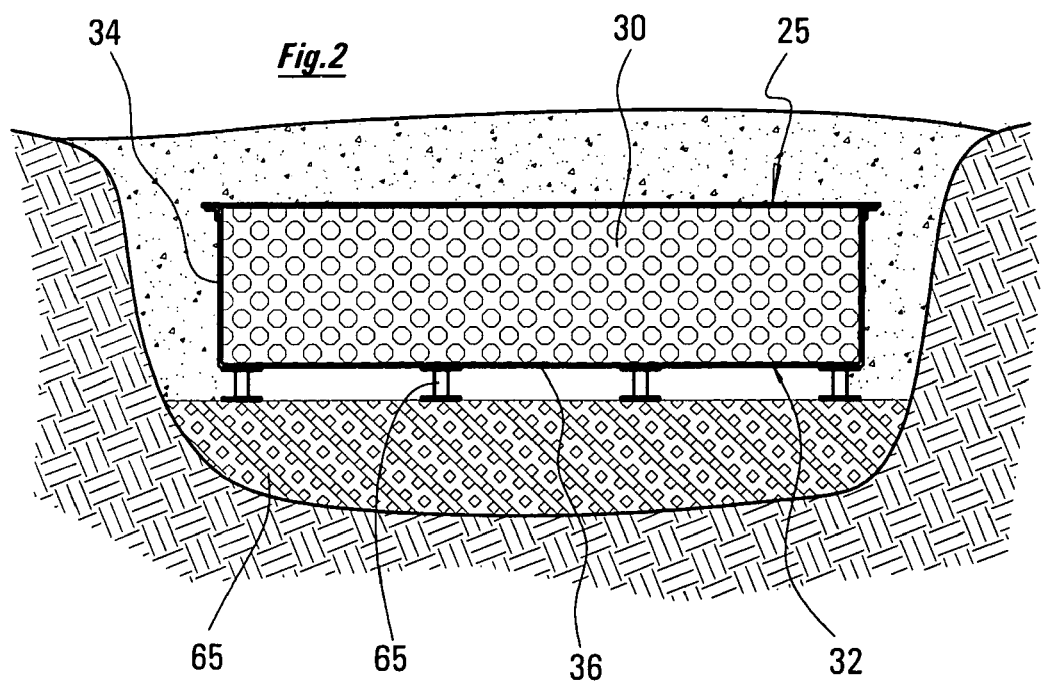
FIG. 2 is a lateral cross-section of an anaerobic treatment station, shown buried in the ground.

FIG. 2 is shows the treatment station 25. Included is a box in which is contained a block of foam 30 (see also FIG. 3). The block of foam 30 is two meters long (its length being measured in the direction of the flow of water through the station 25) and 1.5 meters wide. The block of foam 30 is thirty centimeters deep.

The block of foam 30 is a single unitary piece of virgin, wettable, sponge-like, polyurethane foam. The block 30 has been cut from as-manufactured slabstock. The foam is of the open-cell, or interconnected-cell, type. The foam is soft and resilient, having a typical compression modulus of more than 1.8 units (ASTM 3574-95). The foam should have a cell size (average diameter) of 500 microns, and a porosity of more than ninety percent. The foam should have a density of between about twenty and thirty kilograms per cubic meter. The airflow permeability characteristic of the foam should be between 2.25 and 3.0 s.c.f.m. units (ASTM 3574-05).

The block of foam 30 fits inside a watertight box 32. The internal dimensions of the box 32 define a cross-sectional rectangle, which is slightly smaller than the nominal dimensions of the cross-sectional shape of the block 30, whereby the block 30 is slightly compressed upon being assembled into, and contained in, the box 32. That is to say, the cross-sectional profile of the block of foam 30 is pressed between the left and right side-walls 34 of the box, and between the floor 36 and roof 38 of the box 32. The side-walls of the box should be arranged to provide a compression of between about two percent and five percent on the width of the block, and to provide a compression of between about four percent and seven percent on the height or depth of the block. The percentage figures are related to the nominal dimensions to which the block of foam 30 is cut.

The foam should not be over-compressed, or it might buckle, and thereby actually create a new opportunity for short-circuiting. When the foam contains a mass of absorbed water, the water is held up by capillary forces, the reaction to which presses the foam downwards, into more intimate contact with the floor (and sides) of the box. However, that should not be relied on, and the mechanical compression, as mentioned, preferably should always be provided.

The reasons for making sure the foam is compressed include the fact that any gaps between the block of foam 30 and the walls 34,36,38 of the box 32 would (or might) cause a short-circuit, which, if it occurred, would permit water to pass through the treatment station 25 without passing through the foam, and thus without contacting the colonies of microbes that have become established in the foam, which are the means whereby the pollutants in the water are broken down. The passing water would be attracted to even small non-contact areas, so the designer should see to it that the foam 30 makes contact with the walls over substantially the whole of the designated areas of contact with the walls of the box. Foam is a material in which it is notoriously difficult to maintain dimensional accuracy, and the designer should provide enough compression that the foam material is still compressed even when the dimensional tolerances are adverse.

The designer need not arrange for the box 32 to compress the block of foam 30 lengthways.

In the anaerobic station of FIGS. 1,2,3, the intent is to ensure that oxygen from the atmosphere can not enter and come into contact with the top and bottom, and left and right, faces of the block, and to keep airborne contaminants out of the treatment system. Thus, when colonies of microbes build up in the block of foam, in order to feed on the organic materials in the polluted water, the microbes tend to be of the anaerobic variety.

The system of FIGS. 1,2,3 is suitable for treating polluted river water, which naturally contains dissolved oxygen. The system in fact favours the establishment of a combination of bacteria. Initially (i.e towards the upstream end of the block of foam 30), there is some oxygen present, being dissolved in the river water, which favours the viability of aerobic and facultative bacteria. But then, further into the block of foam, there is practically no oxygen, whereby now the obligate anaerobic bacteria become viable. The effect of this combination is that virtually all the suspended solids, including the carbonaceous-BOD solids, are broken down and removed from the water. The water emerging from the block 30 is more or less completely clear—clear enough, at any rate, to pass the clarity requirements of drinking water.

The anaerobic station 25 of FIGS. 1,2,3 is not suitable for treating ammonium. Of course, ammonium is rarely present in river water. Dissolved ammonium, if present, is more effectively dealt with by aerobic bacteria, which convert the ammonium into nitrate.

Figure 5:
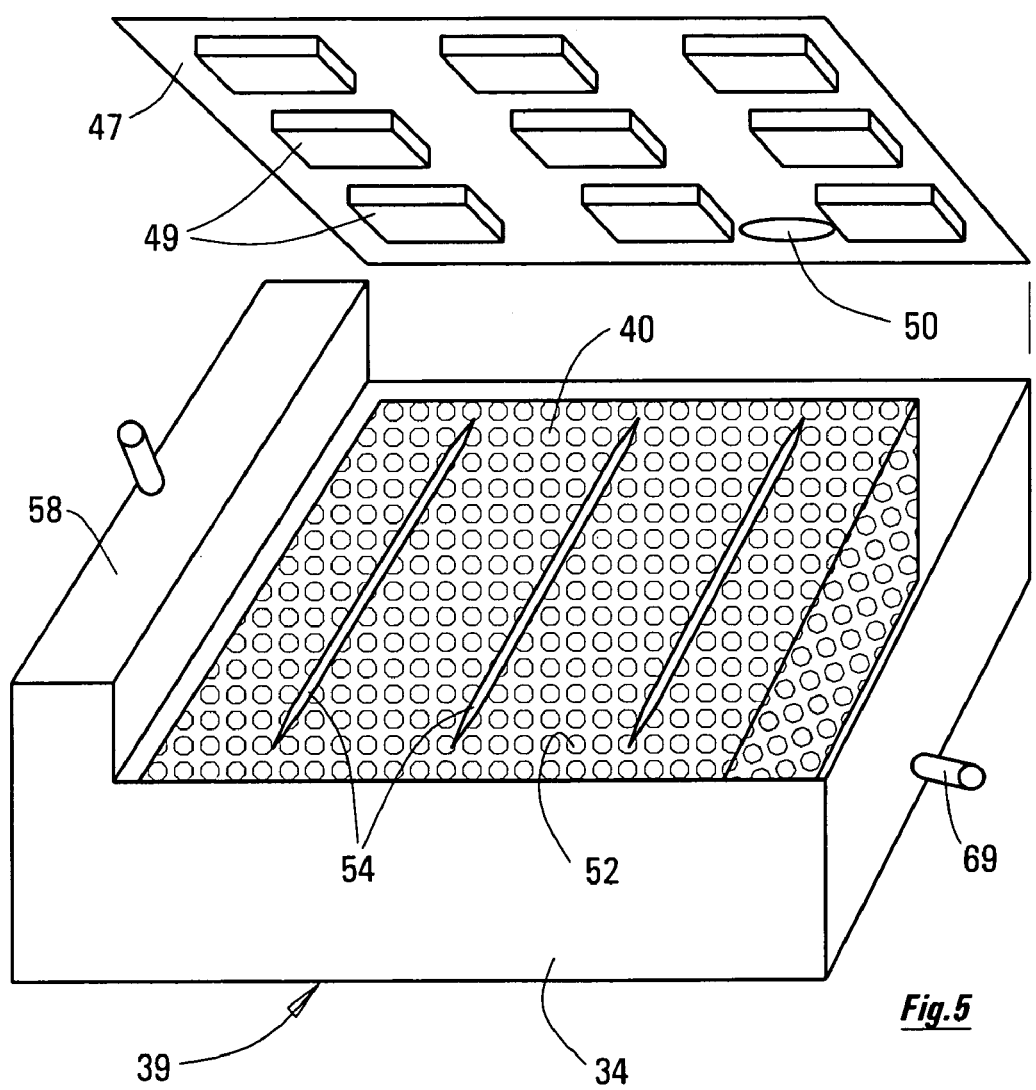
FIG. 5 is a pictorial view of an aerobic station, shown partly opened.

FIGS. 4,5 show another treatment station 39, which now is set up for aerobic operation. This is suitable for treating e.g septic tank effluent (which does contain ammonium—and also, usually, significant amounts of dissolved organic pollutants). In FIGS. 4,5, the block of foam 40 is similar to the block described in relation to FIG. 3 In FIGS. 4,5 also, the block of foam 40 is compressed and squeezed between the left and right side-walls 34 of the box 41, because it is still important that the water undergoing treatment cannot be allowed to by-pass or short-circuit the foam. Since the treatment is to be aerobic, the block of foam should not be squeezed tightly against the roof 43 of the box 40; however, the block does need to be squeezed tightly against the floor 45 of the box, in order to ensure that no short-circuiting takes place along the floor.

As shown, the lid 47 of the box 41 is formed with pads 49. These pads 49 push against the top face of the block 40, and press the block down against the floor 45. The pads are so shaped as to apply an effective downwards force over the whole area of the floor of the block, but yet the pads 49 are spaced well apart so as to permit free air access to the top surface 52 of the block. An air communication port 50 communicates the space under the lid 47 with the atmosphere. Spaces between the pads admit air to the top surface of the block.

The pad 49e nearest the entry-chamber 58 preferably should extend right across the width of the box, whereby the pad 49e seals off the entry-chamber from the airspaces between the lid 47 and the top surface of the block of foam. If that were left unsealed, water might simply flow along the top surface of the block, thereby bypassing the foam, if the entry-chamber became over-full.

The pads 49 may be formed as small pieces of the same foam material as the block, suitably located on top of the block.

Also, in FIGS. 4,5 the block of foam 40 is provided with slits 54 in its top surface 52. The slits 54 are cut into the surface e.g with a knife. The slits improve the contact between the air and the water being treated. The saturation level, i.e the level to which the block of foam is saturated during normal operation, is indicated in FIG. 4 by the line 56; and the slits should be deep enough that a level of liquid water is present in the slits—e.g down to about fifteen cm or less above the floor. The saturation level 56 varies, of course, with the depth of water present in the entry-chamber 58: FIG. 4 shows a typical situation shortly after a dose of water to be treated has been received into the entry-chamber 58, and is passing through the block of foam 40, and undergoing treatment, on its way to the exit-chamber 60.

Figure 6:
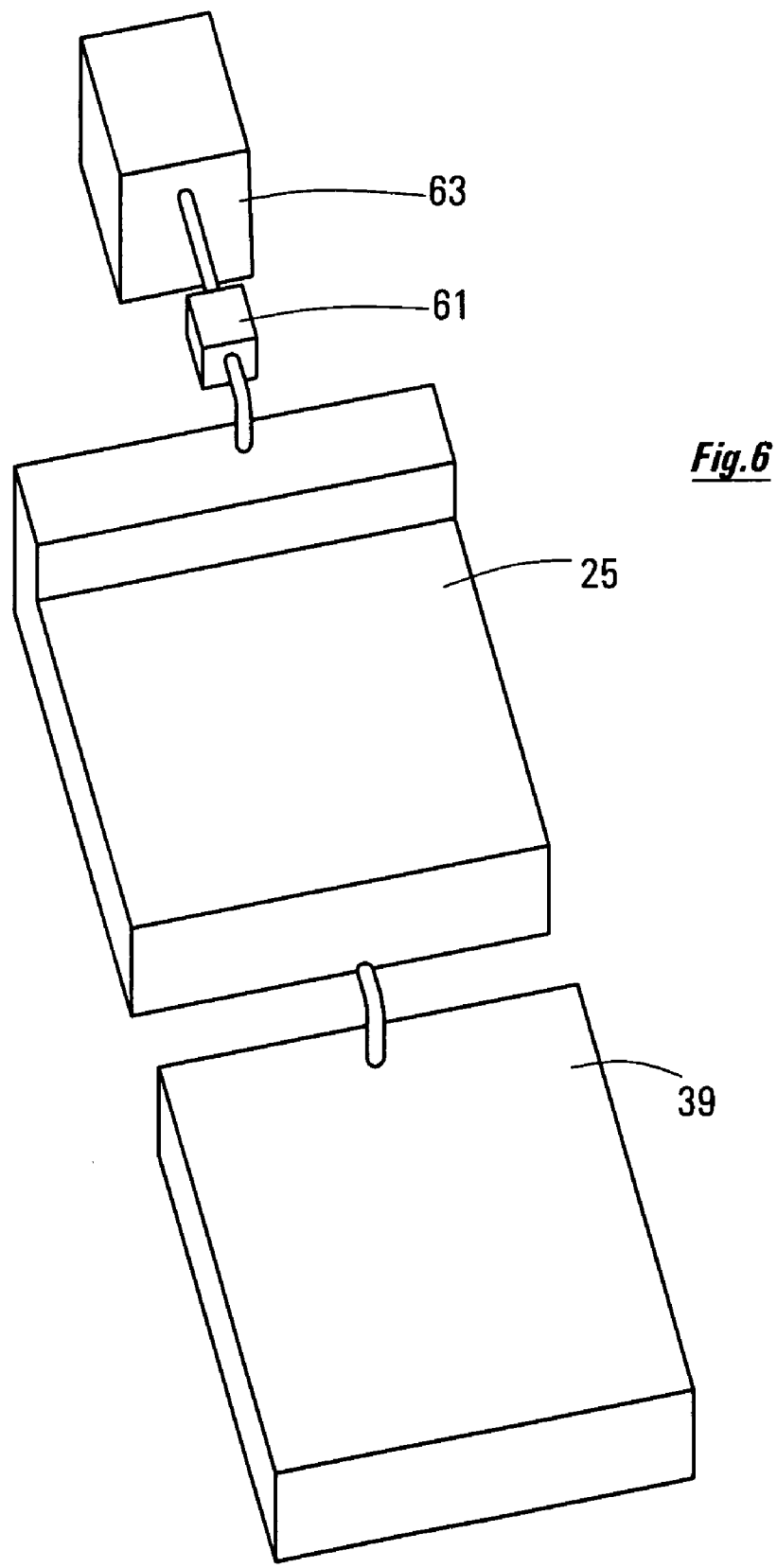
FIG. 6 is a pictorial view of a treatment system that includes both an anaerobic station and an aerobic station.

In some cases, it is desirable to include both an anaerobic station and an aerobic station. This is shown (diagrammatically) in FIG. 6. Effluent is pumped, by pump 61, from a septic tank 63, and such output typically contains, in addition to ammonium, a high count of suspended solids and BOD. In that case, it can be helpful to pass the septic tank effluent through first an anaerobic station 25 to clarify the water, followed by an aerobic station 39 to remove the ammonium and the dissolved organics.

As in the case of the anaerobic treatment station, the present invention allows or enables the treatment to be carried out using only a small hydraulic pressure head. Again, it takes only a comparatively small degree of favourable terrain, and powered pumping is not needed at all.

In a case where the treated water has to be disposed of into the ground, it can be arranged that a soakaway be provided underneath one or both of the stations 25,39. FIG. 2 shows the box 32 of the treatment station 25 supported on pillars 65, which rest of a gravel and pebble bed 67. Treated water is trickled onto the gravel, and thence passes down into the ground.

Within the aerobic station, the designer may arrange to provide a powered fan etc, in order to promote air circulation. However, the designer might prefer to avoid active aeration. The facultative microbes that are favoured when the aeration is not so vigorous can be especially effective to remove organic pollutants. The traditional vigorous aerobic activity can be less effective at removing solids from the water.

In fact, the aerobic station 39, as described, is configured to provide only a reduced degree of aeration within the block of foam 40. That being so, facultative microbes tend to populate the block of foam, instead of obligate aerobic microbes. The result is that aerobic solids (e.g in sludge form) are minimised, lessening maintenance and the chance of clogging.

It should be expected that the less-aerated effluent will contain a rather higher ammonium-to-nitrate ratio than is traditional—but this is advantageous, in that the positively-charged ammonium ions are removed from the water by (shallow) soil absorption, reducing the amount of nitrogen that enters the groundwater at deeper levels.

The aerobic system as described is aimed at making it possible to provide water treatment in comparatively shallow treatment installations, and the higher ammonium content encourages total nitrogen removal (from the water that enters the aquifer) in a shallow soil disposal system.

It has previously been considered that, in order for water to be expected to be treated adequately, the block of foam should be of a long-by-narrow configuration, i.e should be long as to the length of the path along which the water travels in passing from the inlet to the outlet, and narrow as to the cross-sectional throat area of the block of foam through which the water passes. The long-by-narrow configuration was considered to be necessary because the inevitable variations in permeability of the foam might lead to short-circuits, or pathways.

Water naturally seeks out the pathway of highest permeability, and an unfortunate effect of that is that the permeability of (and the flowrate along) that particular pathway would gradually tend to increase; and equally the permeability and flowrate in the less permeable areas would gradually tend to decrease. The fear has been that the combination of these positive-feedback effects might render much of the foam volume rather ineffective in treating the water, while the portion of the foam that lies in and near the permeable pathways might be unable to cope with a too-rapid rate of through-flow. That fear is why the long-by-narrow configuration has been favoured.

It has been recognised that, in fact, commercially-available foam is now usually sufficiently homogeneous that the problem of short-circuiting through the block of foam is really rather small—at least within the parameters as described herein. It has been recognised that, in many cases, the need for a long-by-narrow configuration can be relaxed.

The effect of that, in turn, is that the cross-sectional throat area of the block of foam can be large. A large cross-sectional block-throat-area means that the through-put or flowrate of water can also be correspondingly large.

In the present treatment system, the volume of the block of foam is disposed in a comparatively short-by-wide configuration. Overall, the block of foam, as a total volume, should be large enough to contain enough microbes, and to provide a long enough residence time, to properly treat all the passing water.

Putting some numbers to this aspect, the overall volume of the block of foam is determined by the type of pollutants, and by the volume of incoming water to be treated—or rather by the flowrate, or volume of water to be treated over a period of time. For septic tank effluent, for example, the volume of the block of foam should be at least 1.5 liters of foam per liter/day of water flowrate, to ensure adequate treatment. More than about 3.0 liters of foam would be wasteful.

In the case of a treatment station suitable for a small family residence, where the station is arranged for aerobic treatment of septic-tank effluent, regulations typically stipulate that provision should be made for treating a flowrate of 1600 liters/day of effluent volume. Using the above figures for the liters of foam per liter/day of flowrate of water, the volume of the block of foam required for such a residence therefore should be between 2.4 and 4.8 cubic meters.

In the case of an anaerobic treatment station, e.g for the anaerobic treatment of riverwater, the volume of the block of foam typically should be between 0.5 and 1.0 liters of foam per liter/day of treated water flowrate. Thus, for a small potable water delivery system that is to provide say 5000 liters per day, the block of foam should have a volume of 2.5 to 5.0 cu.meters.

These figures for the overall volume of the block of foam assume that every portion of the foam in the block is equally effective in treating the passing water, and that no short-circuiting occurs. The latter being never quite true, the designer should provide a margin, i.e should provide extra volume. In fact, the volumes mentioned above already include enough margin for the case when the volume of the block of foam is disposed in a long-by-narrow configuration—where short-circuiting can be expected to be at a minimum. It is recognised, now, that the extra margin needed for the short-by-wide configuration is small, or even zero.

In the present treatment system, again in the case of the small septic-tank aerobic treatment station, the block-volume preferably is disposed such that the cross-sectional area, or block-throat-area, of the block of foam should be between 1.5 and 2.5 square meters, per 1000 liters/day of water flow. In the case of the anaerobic river water treatment system, assuming there is little dissolved organic content to be broken down, preferably the cross-sectional area of the block of foam is between 0.3 and 0.5 square meters.

Thus, for aerobically treating e.g 200 liters/day of septic-tank effluent, the block-throat-area of the foam would be e.g 1.2 meters wide by 0.3 meters deep, which is 0.36 sq.meters—or 1.8 sq.m of block-area per 1000 liters/day of water throughflow. For anaerobically clarifying e.g 2000 liters/day of river water, the block-throat-area would be e.g 1.2 meters wide by 0.6 meters deep, which is 0.72 sq.m—or 0.36 sq.m of block-area per 1000 liters/day of water throughflow.

Preferably also, the cross-sectional block-throat-area should be arranged such that the width of the block of foam is greater than the depth of the block of foam. Indeed, preferably, the block-width should be more than 1.5 times the block-depth of the block of foam. This latter preference applies especially for aerobic treatment of septic tank effluent. As far as the physical installation of the treatment station is concerned, including excavation etc and the preparations for the installation, width is generally easier (i.e cheaper) to accommodate than depth.

Also, if the block of foam were to be shaped with a larger depth than width, the pressure head of water within the foam might then vary too much. When the block of foam is wider than it is deep, the pressure head remains reasonably constant, varying little, neither between the entry end and the exit end of the block of foam (as shown by the line 56), nor between the just-dosed condition and the not-recently-dosed condition.

The requirements for volume and cross-sectional area can be thought of not simply as volumes and areas, but as residence times. The water undergoing treatment should remain in contact with viable microbe colonies for a particular residence time: in the case of aerobic treatment of septic tank effluent the residence time should be at least a day; in the case of river water undergoing anaerobic clarification, the residence time can be reduced to e.g eight hours.

The length of the block of foam is defined as follows. The block-length is the shortest path, through the foam, that a drop of water can take, from the entry-point to the exit-point of the block of foam.

An entry-surface of the block of foam is that surface of the block of foam that is in direct wetted contact with untreated liquid water contained in the entry-chamber. The entry-point is the highest point on the entry-surface, being a point that lies within twenty cm of the vertical centre-line of the entry-surface.

With respect to the exit-point, there is no point on the block of foam that is nearer to the exit-port 69 (FIG. 3), being the port through which treated water leaves the exit-chamber.

Preferably, in the case of an anaerobic water clarification station, where the aim is not to take out dissolved organics, the block-length should be at least 1.2 meters. If it is the aim to also reduce dissolved organics, a block-length of at least 1.8 meters or more would be preferred.

In the case of a ventilated or aerobic treatment station, where the incoming water is septic tank effluent containing dissolved organics and ammonium, the block length should rather be at least 2.5 meters.

If the block-lengths were less than these dimensions, it might be possible for water contaminated with dissolved organics to pass right through the block and not be properly treated. (The lesser demands of e.g river-water clarification require smaller block-lengths.)

Preferably, the block-length should not exceed four meters in the aerobic septic-tank effluent case. The system as described herein is intended, commercially, for small-residential (and similar) water treatment installations. That is where the benefits of the shapes and configurations as described herein are most cost-effective. In larger treatment installations, the potential savings can disappear.

The block-throat-area of the block of foam is the cross-sectional area of the block, being the area of the cross-sectional profile of the block that is available for through-flow of the water undergoing treatment. Block-throat-area is the product of the block-width and the block-depth.

The treatment system as described herein is primarily intended as a shallow, lateral flow system—mainly because a system like that has potentially a small initial installation cost, and small ongoing maintenance costs. A system would be regarded as not so intended if the entry-point were more than about 0.6 meters above the exit-point.

Effluent water from a septic-tank that requires subsequent treatment is often applied to the subsequent treatment system in periodic doses. This is especially true in small treatment stations—which is the main concern of the present technology. It is advantageous if the station can simply accommodate whatever size of doses happen to be applied, without the designer needing to provide some means of metering the doses, to even out the flow. Thus, the designer should make provision that, if an unusually large (even abusive) quantity of water should be dosed into the entry-chamber, the entry-chamber does not overflow.

For this reason, the entry-chamber should be large. In particular, the entry-chamber preferably should be as wide as the width of the block of foam. Also, the entry-chamber should be at least half as long (in the same direction as the length of the block of foam) as the block is deep.

As to its height, the entry-chamber preferably should stand higher than the block of foam, particularly in the case of the entry-chamber of an anaerobic station. Alternatively, or additionally, the designer might provide an automatic level-control system for the entry-chamber, which would meter incoming water so as to maintain a desired level. However, in most cases, automatic level-control would be too sophisticated for these small installations, and making the entry-chamber taller than the depth of the foam, as shown in the drawings, is sufficient.

Incoming water can be metered by a simple float arrangement in the entry-chamber, which prevents any further liquid from entering the entry-chamber if the entry-chamber level is already high. That would be acceptable if the station from which the water is drawn (including the river, in that case) can cope with backing-up.

It will be understood that, in the system as described herein, there is no need to pump water to a height for spraying or sprinkling down onto a biofilter medium—which can be a disadvantage in e.g a trickle-type biofilter. In the present system, the water, having been simply placed in the entry-chamber, later simply flows out, clarified and treated, without further input of energy, from the exit-chamber.

In the case of the anaerobic water treatment, the normal operational height of the level of water in the entry-chamber might be above the top surface of the block of foam, as shown in FIG. 3. In the case of the aerobic treatment of the septic-tank effluent, the normal level should be below the top surface of the block of foam, so that the top surface is in contact with free air. The designer should arrange the sizes of the components, and the dosing and through-flow rates, etc, accordingly. The height of the entry-chamber preferably should be a half the block-depth, or more, above the top of the block of foam, for the anaerobic, and about a quarter of the block depth above the top of the block, for the aerobic.

If the incoming water that requires treatment is fed in at a constant rate, of course no provision for varying or extra large dosages need be made. Thus, water drawn from a river, for clarification, would usually be drawn at a constant rate, rather than in doses, in which case the capacity of the entry-chamber can be smaller.

Figure 7:
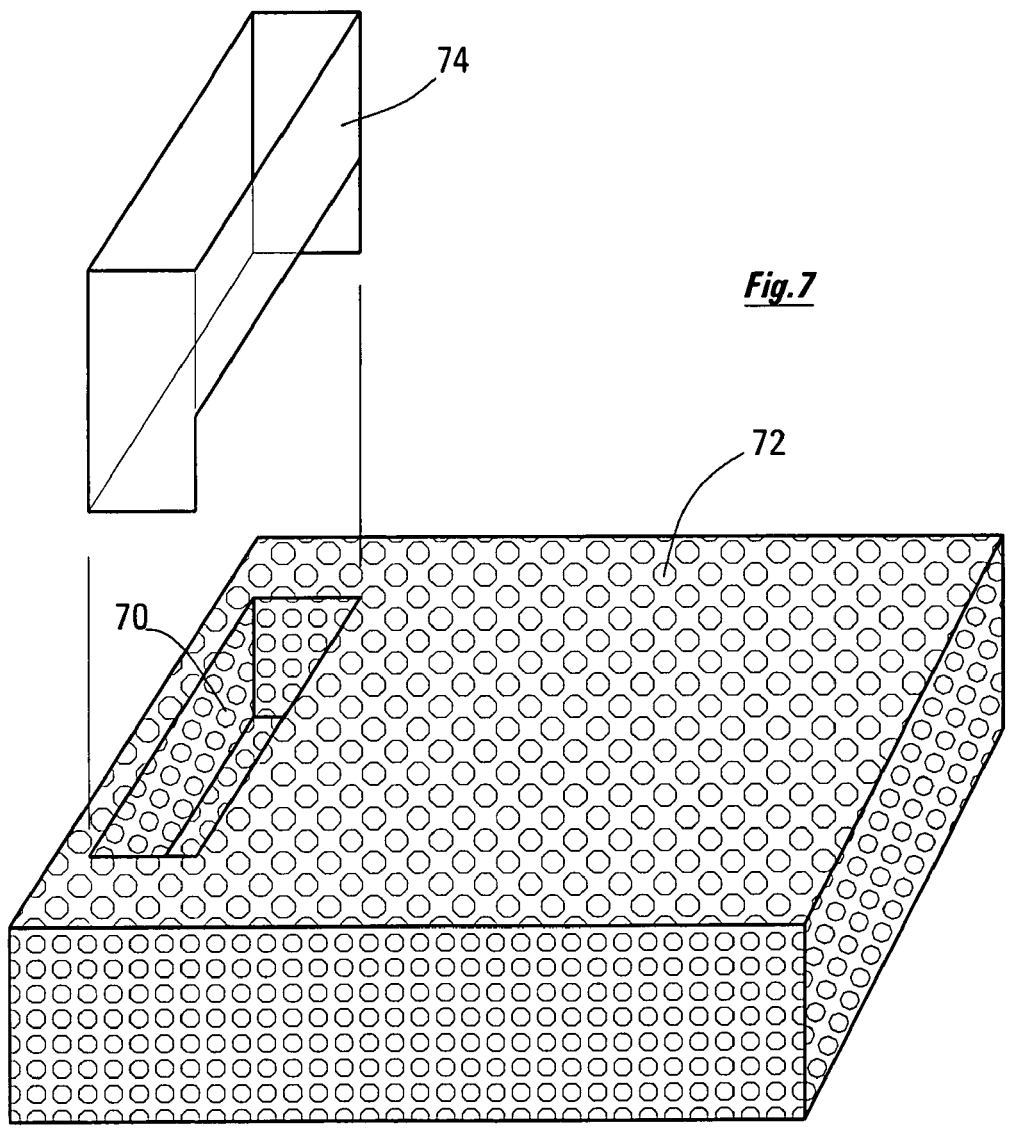
FIG. 7 is a pictorial view of a block of foam, having an entry-chamber.

FIG. 7 shows another variant, in which the entry-chamber is formed by making a cut-out 70 actually in the foam material. The cut-out in the foam material preferably is engineered by the (conventional) hot-wire technique, rather than by cutting as such. The block of foam 72 also includes a similarly-fashioned exit-chamber. The block of foam is inserted into a box, similar to that described above (which has been omitted from FIG. 7).

Again, in the case where the entry-chamber is required to extend above the top surface of the block of foam 72, the required upstanding walls of the extended entry-chamber can be provided by a walls-assembly 74 (which might include its own lid). The walls-assembly fits into the cut-out 70. The designer should see to it that the walls-assembly 74 is suitably sealed to the box or box-lid.

Again, the entry-chamber should be large enough to accommodate surges of influent water, as imposed on the system by water usage variations. Generally, the exit-chambers in the stations can be smaller, but should be large enough to ensure that the exit-port remains clear.

As described, one of the reasons for preferring the block of foam to be rectanguloid is that a rectanguloid is easy to manufacture, and is easy to control as to its dimensional tolerances.

It is also recognised that it is possible, and in fact easy, to adequately seal a rectanguloid block of foam into its (rectangular) box, despite dimensional tolerance unpredictabilities, to the extent that short-circuiting is of little significance.

It is preferred that the block of foam be constituted as a single unitary piece. Suppose, for example, that the requirement is for a block of foam to have overall dimensions two meters long by 1.4 meters wide by 0.7 meters deep; and suppose the designer specified that the block be comprised of two (rectanguloid) pieces of foam, each 0.7 by 0.7 by 2.0 meters placed side by side. Now, the danger would be that two pieces would be likely to differ somewhat as to their permeabilities. So, even if the two pieces are placed together in a common entry-chamber, whereby both are subjected to the same pressure head, still the dirty water would pass through one piece at a higher flowrate than through the other. And once the difference in flowrate was there, it would increase.

But when the block is in one piece, now the chances of differences in permeability within the block are insignificant. Foam is manufactured in the form of huge slabstocks, which are then cut up as required. Manufactured like that, the foam is highly homogeneous. But still, there are likely to be differences in permeability between e.g pieces manufactured on different days. But the chances are small indeed, of significant differences in permeability between adjacent locations within a single unitary piece of foam.

It may be noted that foam that is manufactured within a dedicated-shape mould is considerably more expensive, and is considerably less likely to be homogeneous.

So, the block preferably should not be made up of separate pieces laid side by side. If anything, where separate pieces do have to be used, the pieces should be arranged sequentially along the block-length, whereby each separate piece extends over the full width of the block. At least, then, any differences in permeability, piece to piece, would only cause the water to experience differences in flowrate as it passed through the overall block of foam—but each drop of water would experience the same levels of permeability overall. It may be noted that the junction between two separate pieces of foam would inevitably be less permeable than the pieces themselves, so there would be little compensation by way of cross-flow, to even out any differences in permeability between adjacent blocks.

In case the foam being used does indeed vary significantly, over the width of the whole block of foam, as to its permeability, in that case cross-flow (i.e flow within the block that has a sideways component) should be restrained, because cross-flow then would likely increase the danger, and the effects, of short-circuiting. It might, in that case, be advantageous then to resort to separate pieces arranged longitudinally side by side.

When the foam being used does vary significantly as to its permeability, instead of using separate pieces, the designer might prefer instead to provide longitudinal slits, which are formed up from the bottom surface of the (large) unitary piece into the bulk of the piece. Then, thin barriers (e.g of sheet plastic, metal, etc,) would be inserted into the slits, to prevent cross-flow between the separated areas between the barriers.

Again, however, when the foam is made in large slab-stocks, cut into rectanguloids, problems with permeability differences tend to become insignificant, especially when the block of foam is a single unitary piece cut from the slabstock. The designer should see to it that the entry- and exit-chambers are designed so as not to introduce any pressure head differences or gradients, but it will be understood from the drawings that really there is no problem in ensuring that all, or a large part of, the entry-surface of the block is subjected to the same entry pressure head, and also that all the exit-surface is subject to the same (zero) exit pressure head.

In some cases, it can be advantageous, however, to provide a separate piece of foam at the upstream end of the block, immediately downstream of the entry-chamber. If there is to be any deposition of solids, as a result of treatment, it is likely that these solids will be deposited at the upstream end of the block of foam. The fact that the separate piece is located here means that this separate piece can be taken out and cleaned, or replaced, e.g once a year as part of a routine maintenance activity. The designer might also then provide a separate small lid, in the box, to simplify removal of just this small piece of foam.

The rectanguloid block of foam, besides being arguably the cheapest form in which a block of foam can be purchased, also is easy to seal to the box, sealing being just a simple matter of pressing flat single-plane surfaces together. Also, the box itself, especially a box with a lid, could hardly be simpler and cheaper to make if it were of some shape other than rectanguloid.

As regards shipping and storage, a rectangular box can easily be arranged to be folded flat, and a unitary block of foam can readily be packed into a small space. On the other hand, the stations described herein, even when assembled and ready for use, are simple to store and ship—at least when compared with other water treatment stations. Also, the cost of such activities as digging a hole for the box, and burying the box, are minimised.

The stations as described herein are intended for use in small water treatment installations, such as those associated with single residences. If it is desired to use the technology on a larger scale, the preference would be to provide additional blocks of foam, each within the size parameters as described herein, rather than to make the block of foam larger.

Also, on the subject of costs, one of ongoing costs of a water treatment system is the cost of pumping. The invention makes it possible, in many cases, that, if the lie of the land is only marginally favourable, powered pumping can be dispensed with altogether. Of course, if the lie of the land rules out gravity as the creator of the required pressure heads, pumping of some kind is required. However, the costs of providing and running a pump is affected by the heads involved—the smaller the head, the cheaper the pump. The treatment station as described herein has, or can have, a very low overall height. The system provides that the water flows mainly (almost) horizontally, rather than mainly vertically, whereby the pressure head is at a minimum. There is an entry-chamber at one end, into which the water to be treated is fed (perhaps pumped) and there is an exit-chamber, at more or less the same level as the entry-chamber, at the other end, from which the treated water can be collected simply by free-drainage. A water treatment system configuration that was more conducive to minimising overall expense can hardly be imagined.

In a variant, the box is formed as a bag of flexible impervious fabric material. Preferably, the material of the bag is glued to, and around, the block of foam. This can be done by adding a gelcoat or other sealant to the foam, and then spraying on fibreglass to form the box. In that case, the chances of leaving spaces (being spaces whereby water might bypass the foam, and pass between the foam and the bag) is even further reduced. In fact, also when the box is formed of rigid panels, the panels could be glued to the lock of foam.

In another variant, the block of foam is formed as a moulding. Optionally, the box may be formed as a moulded impervious skin around the as-moulded matrix of open interconnected pores. (When moulding foam, typically an impervious skin will form naturally, around the moulded shape.) The upstream and downstream ends of the moulded block are cut off, to expose the open cellular structure, in which the microbe colonies can become established. Entry- and exit-chambers are added, as described herein.

The material through which the dirty water is passed has been described as foam, and that is preferred. However, other materials can be used. The material should have the following properties: it should be absorbent, and capable of capillary action with water. It should hold the water, and not dry out over a period of time, preferably measured in days, even when drained out. The material should be porous enough to allow free flow of water through the material, but absorbent enough to physically impede the flow, by capillarity and absorption— to the extent that a substantial pressure head differential or gradient is constantly present between the entry- and exit-chambers. The interior surfaces of the material also should be able to serve as an attachment medium, to which microbe populations can attach themselves.

Apart from foam, rockwool is a candidate material, which comprises random fibres of organic glass, the block of rockwool having a porosity of 95%.

The box, as mentioned, could be formed from a flexible fabric, but preferably it is formed as a fibreglass moulding. The material of the box should be inert with respect to the water (and the pollutants) passing through it, and also should resist corrosion. The box should be physically strong enough to contain the foam, and, if the station is to be buried, to support the weight of soil etc applied on top of the box. The box is preferably made of plastic, preferably from fibreglass.

The box, including the lid, should be rigid enough that even the foam material in the middle of the block of foam is still squeezed enough to ensure there are no gaps whereby water might bypass the foam. Preferably, the roof or lid of the box presses the block of foam down against the floor. In the aerobic case, there is an airspace above the block of foam, i.e between the block of foam and the lid or roof, but still the lid or roof should touch the block of foam, in order to keep the block pressed down against the floor.

In place of the spaced pads 49, as described, the designer might prefer to provide reinforcing ribs in the lid of the box. If so, for the anaerobic treatment station, the ribs should be so arranged as to inhibit airflow over the top surface of the foam. Thus, a honeycomb pattern of ribs would be advantageous. In the aerobic station, the ribs should be arranged so as not to interfere with the airflow.

Preferably, the floor of the box is simply flat. If ribs were provided on the floor, they would permit water to bypass the foam, and also water might collect between the ribs and become stagnant. Preferably, every square cm of the bottom surface of the foam is pressed firmly against the floor.

Similarly, the left and right sides of the block of foam (assuming those sides to be flat surfaces) should be pressed against simple flat surfaces on the sides of the box.

The cover or lid of the box could be one piece, or several pieces. Preferably, provision is made to permit service inspections and maintenance. Preferably, as mentioned, a lead-portion of the block of foam near the entry-chamber is replaceable, and a portion of the lid or cover, near the entry chamber, should be separately openable, to enable servicing of the lead-portion. Also, a hatch should be provided near the exit-chamber, to permit that to be cleared, if it should become clogged.

The box may be buried, or may be laid on top of the ground. The floor of the box should be level. The floor should not slope upwards, and especially should not have a step upwards, as that could lead to water becoming stagnant. The floor (and the block of foam) should be level or inclined slightly downwards. However, the floor should not be so inclined that the floor level at the exit-end of block is more than about twenty cm lower than the floor level at the entry-end.

The treated water emerges from the treatment stations through an exit-port, whereby the water can be collected, and can be piped for further treatment and/or storage.

Alternatively, the water can be eased into the ground by means of a soakaway, which can easily be located underneath the box, as shown in FIG. 2. In case there are still some dissolved toxic materials or pollutants present, but these can be dealt with at/by a disinfectant station 27. The designer can arrange for the (traditional) disinfectant station to operate automatically, if so desired.

In the context of this specification, a station is configured for anaerobic operation when it is so arranged as to promote viability of anaerobic bacteria within the pores of the treatment material, and when the box is so arranged, in relation to the block, as to enclose the block within the box, in such manner as to substantially prevent air from the atmosphere from contacting any portion of the side surfaces, and of the top and bottom surfaces, of the block.

A station is configured for aerobic operation when it is so arranged as to promote viability of facultative or aerobic bacteria within the pores of the treatment material, and when the box is so arranged, in relation to the block, as to create an airspace above a top surface of the block, and as to admit air from the atmosphere into the airspace.

The expression "substantially rectanguloid", as employed herein, should be construed to read onto slight variations from the true geometrical ideal. For example, if the block (and the box) were formed with slightly tapered sides, to make it easier to assemble the block of foam into the box, that would still be included.

In this specification, suspended solids are "significant" if present at more than about 500 milligrams per liter of water, whether mineral or organic. Dissolved organics are significant at more than about 200 mg/liter of cBOD. Ammonium is significant at more than about 10 mg/liter of ammonium-N.

The numerals that appear in the drawings may be listed as:
20 river
21 pipe
23 pump
25 anaerobic station
27 disinfectant station
30 block of foam
32 watertight box
34 sidewalls of foam block
36 floor of box
38 roof of box
39 aerobic station
40 block of foam
41 box
43 roof
45 floor
47 lid
49 pads
50 air communication port
52 top surface of foam block
54 slits in foam block
56 line of saturation
58 entry-chamber
60 exit-chamber
61 pump
63 septic tank
65 pillars
67 gravel bed
69 exit-port
70 cut-out
72 block of foam
74 walls-assembly

The invention claimed is:

1. Water treatment station, wherein:
the station includes a block of treatment material, having a block-throat-area, being the product of a block-width and a block-depth, and having a block-length, these dimensions being overall with respect to the block;
the treatment material is porous, and the pores are open, to the extent that water can pass in the direction of the block-length along and through the block of treatment material, and to the extent that bacteria can form viable colonies in the pores;
the treatment material is soft, and is resiliently compressible;
the treatment material is substantially inert with respect to water, and with respect to pollutants contained within the body of water, and with respect to microbes residing within the pores of the material;
the treatment material is significantly absorbent, and has significant capillary attraction with respect to water passing through the block;
the station includes a watertight box, which contains the block of treatment material;
the box includes an entry-chamber, containing water for treatment, being water that has not yet entered the block of treatment material;
the box includes an exit-port through which treated water is discharged from the station;
the box includes walls, being left and right side-walls, a floor and a roof;
the box is so dimensioned, relative to the block, that the block-width of the block is compressed between the left and right side-walls; and
the box is so dimensioned, relative to the block, that the block-depth of the block is compressed between the roof and the floor; and
the degree and manner of compression is such as to ensure that substantially no gaps exist between the block and the side-walls, nor between the block and the floor, through which water passing from the entry-chamber to the exit-port could bypass the block.

2. As in claim 1, wherein the block is rectanguloid in that:
the block has left and right side-surfaces, a top-surface, and a bottom-surface;
the block-width and the block-depth are substantially constant at all points along the block-length;
the block-length and the block-depth are substantially constant at all points along the block-width; and
the block-length and the block-width are substantially constant at all points along the block-depth.

3. As in claim 2, wherein the block has an effective-block-length, which is defined as follows:—
(a) the block has an entry-surface, being that surface of the block that is in direct wetted contact with untreated liquid contained in the entry-chamber;

(b) the block has an entry-point, being the highest point on the entry-surface;
(c) the block has an exit-point, being the nearest point on the block to the exit-port; and
(d) the effective-block-length is the shortest distance a drop of water can travel in passing through the block from the entry-point to the exit-point; and
the effective-block-length is at least 1.2 meters and no more than 2.4 meters.

4. Station of claim 1, in combination with a body of water undergoing treatment, wherein:
the station is configured for anaerobic operation;
water in the body of water passes through the block of treatment material;
the water contains significant suspended solids, and significant organic pollutants;
the water contains no more than insignificant dissolved organic pollutants, and insignificant ammonium;
the block-throat-area is 0.5 to 1.0 sq.m, per 1000 liters/day of flowrate.

5. As in claim 4, wherein the effective-block-length is at least 1.8 meters.

6. Station of claim 1, in combination with a body of water undergoing treatment, wherein:
the station is configured for aerobic operation;
water in the body of water passes through the block of treatment material;
the water contains significant suspended solids, and significant dissolved organic pollutants;
the water contains no more than insignificant ammonium;
the block-throat-area is 0.5 to 1.0 sq.m, per 1000 liters/day of flowrate.

7. As in claim 6, wherein the effective-block-length is at least 1.8 meters.

8. Station of claim 1, in combination with a body of water undergoing treatment, wherein:
the station is configured for aerobic operation;
water in the body of water passes through the block of treatment material;
the water contains significant suspended solids and significant dissolved organic pollutants and significant ammonium;
the block-throat-area is 0.5 to 1.0 sq.m, per 1000 liters/day of flowrate.

9. As in claim 8, wherein the ratio of block-width to block-depth is more than three to one.

10. As in claim 1, wherein the water treatment station includes both an anaerobic station and an aerobic station.

11. As in claim 1, wherein:
the exit-port is located in an exit-chamber; and
the exit-chamber contains water that has passed through, and has emerged from, the treatment block.

12. As in claim 11, wherein the entry- and exit-chambers are included as unitary components of the watertight box.

13. As in claim 1, wherein the exit-port is so arranged that the block is free-draining, in that water can drain from the exit-port, substantially down to the level of the floor of the box.

14. As in claim 1, wherein the floor of the box is disposed substantially horizontally.

15. As in claim 14, wherein the entry-chamber has a floor and the exit-chamber has a floor, and those floors are at the same level as the floor of the box.

16. As in claim 1, wherein:
the treatment material is synthetic foam, having interconnected cells;
the foam is resiliently soft, in that the foam can be compressed by squeezing by hand, and resiliently recovers to its un-squeezed dimensions when such squeezing is discontinued.

17. As in claim 1, wherein the block-throat-area is at least 2.4 square meters.

18. Water treatment station, wherein:
the station includes a block of treatment material, having a block-throat-area, being the product of a block-width and a block-depth, and having a block-length, these dimensions being overall with respect to the block;
the treatment material is porous, and the pores are open, to the extent that water can pass in the direction of the block-length along and through the block of treatment material, and to the extent that bacteria can form viable colonies in the pores;
the treatment material is soft, and is resiliently compressible;
the treatment material is substantially inert with respect to water, and with respect to pollutants contained within the body of water, and with respect to microbes residing within the pores of the material;
the treatment material is significantly absorbent, and has significant capillary attraction with respect to water passing through the block;
the station includes a watertight box, which contains the block of treatment material;
the box includes an entry-chamber, containing water for treatment, being water that has not yet entered the block of treatment material;
the box includes an exit-port through which treated water is discharged from the station;
the box includes walls, being left and right side-walls, a floor and a roof;
the box is so dimensioned, relative to the block, that the block-width of the block is compressed between the left and right side-walls; and that the block-depth of the block is compressed against the floor;
the degree and manner of compression is such as to ensure that substantially no gaps exist between the block and the side-walls, nor between the block and the floor, through which water passing from the entry-chamber to the exit-port could bypass the block; and
the ratio of block-width to block-depth is greater than 1.5 to one.

19. Water treatment station, in combination with a body of water undergoing treatment, wherein:
the station includes a block of treatment material, having a block-throat-area, being the product of a block-width and a block-depth, and having a block-length, these dimensions being overall with respect to the block;
the treatment material is porous, and the pores are open, to the extent that water can pass in the direction of the block-length along and through the block of treatment material, and to the extent that bacteria can form viable colonies in the pores;
the treatment material is soft, and is resiliently compressible;
the treatment material is substantially inert with respect to water, and with respect to pollutants contained within the body of water, and with respect to microbes residing within the pores of the material;
the treatment material is significantly absorbent, and has significant capillary attraction with respect to water passing through the block;
the station includes a watertight box, which contains the block of treatment material;

the box includes an entry-chamber, containing water for treatment, being water that has not yet entered the block of treatment material;

the box includes an exit-port through which treated water is discharged from the station;

the box includes walls, being left and right side-walls, a floor and a roof;

the box is so dimensioned, relative to the block, that the block-width of the block is compressed between the left and right side-walls; and that the block-depth of the block is compressed against the floor;

the degree and manner of compression is such as to ensure that substantially no gaps exist between the block and the side-walls, nor between the block and the floor, through which water passing from the entry-chamber to the exit-port could bypass the block;

the station is configured for anaerobic operation;

the water contains significant suspended solids;

water in the body of water passes through the block of treatment material;

the water contains no more than insignificant organic pollutants, and insignificant ammonium;

the block-throat-area is 0.3 to 0.6 sq.m, per 1000 liters/day of flowrate.

20. As in claim 19, wherein the effective-block-length is at least 1.2 meters.

* * * * *